United States Patent [19]

Neve et al.

[11] Patent Number: 4,887,266
[45] Date of Patent: Dec. 12, 1989

[54] COMMUNICATION SYSTEM

[75] Inventors: Brian D. Neve, Exbury; Peter J. Lawrence, Fareham; Lyndon N. Owen, Blackfield, all of England

[73] Assignee: Process Automation & Computer Systems Ltd., London, England

[21] Appl. No.: 2,763

[22] PCT Filed: Apr. 29, 1986

[86] PCT No.: PCT/GB86/00230
§ 371 Date: Dec. 29, 1986
§ 102(e) Date: Dec. 29, 1986

[87] PCT Pub. No.: WO86/06571
PCT Pub. Date: Nov. 6, 1986

[30] Foreign Application Priority Data

Apr. 29, 1985 [GB] United Kingdom ............. 8510808

[51] Int. Cl.⁴ .............................................. H04J 3/16
[52] U.S. Cl. .............................................. 370/95.1
[58] Field of Search ................ 370/95, 96, 89, 90; 340/825.08

[56] References Cited

U.S. PATENT DOCUMENTS

| | | | |
|---|---|---|---|
| 3,755,786 | 8/1973 | Dixon et al. | 370/89 |
| 4,078,228 | 3/1978 | Miyazaki | 370/89 |
| 4,129,749 | 12/1978 | Goldman | 370/50 |
| 4,161,718 | 7/1979 | Cohen et al. | 371/71 |
| 4,270,185 | 5/1981 | Cohen et al. | 364/900 |
| 4,326,265 | 4/1982 | Cohen et al. | 364/900 |
| 4,466,001 | 8/1984 | Moore et al. | 340/825.08 |

FOREIGN PATENT DOCUMENTS 2024571 1/1980 United Kingdom .
2035641 6/1980 United Kingdom .

OTHER PUBLICATIONS

I. Kong et al, "CableNet: A Local Area Network Reservation Scheme", 24th IEEE COMPUTER SOCIETY INTERNATIONAL Conf. Feb. 22–25, 1982, N.Y.

L. C. Chien, "Short-Range Radio Transmission of Sensor Data", National Telecommunications Conf. V4, Nov. 30–Dec. 4, 1980, N.Y.

Primary Examiner—Joseph A. Orsino
Assistant Examiner—Frank M. Scutch, III
Attorney, Agent, or Firm—Bacon & Thomas

[57] ABSTRACT

A communication system able to provide multiple path communication between a plurality of stations operating on a single channel. The stations are synchronized and a cyclically repeating series of time slots is defined. One time slot in each cycle is reserved for the transmission of synchronization information by a station designated the master station for reception by the other stations, designated slave stations, and maintaining synchronization therein. Another time slot is reserved for any slave station to transmit a message that it requires to communicate to another station, such indication preferably being by transmitting its own pre-assigned address code. The remaining time slots are used for transmitting address information and data. The slave stations operate in a low power condition except during one of the other time slots when they may receive their own address, or except when they need to transmit data.

12 Claims, 9 Drawing Sheets

DATA WORD FORMAT

DATA BATCH FORMAT

S : SYNCHRONISATION WORD
I : INTERRUPT WORD

COMMUNICATION SYSTEM

BACKGROUND OF THE INVENTION

This invention relates to a communication system and in particular to a radio communication system capable of supporting a network of intercommunicating points with a variety of communication paths therebetween. The invention has particular utility in applications where a relatively large number of devices are required to intercommmunicate, such as in industrial plant and process monitoring and control, but the benefits and advantages of the invention are by no means restricted to such applications.

Communication networks employing cable (electrical and optical) connections and radio links are of course well known. Cable systems have the disadvantage that the capital cost of the equipment and the installation costs are relatively high. Whilst switched systems can provide great flexibility in the communication paths which are established, the provision of communications to a point not served by the original network may involve considerable difficulty and expense. Radio systems have the advantage that a transmitting and/or receiving station can normally be set up relatively easily in any location but there may be difficulty in providing a power supply to the station and often a radio station is relatively large and in particular may require a large antenna. There are many applications where it is desirable to provide a communications system in which the transmitting and receiving apparatus is small, may be easily installed in any location, and is of very low power consumption so as to mitigate the problem of power supplies. For example, on a site such as a refinery there may typically be of the order of 4000 points between which it is desired to provide data communication for process control purposes. There may, for example, be 3000 sensors at various points in the plant and perhaps 1000 receiving devices, such as data recording devices or actuators, such as valves. Data integrity and security are of course of great importance in such an application and this factor, together with the need to avoid any danger of electromagnetic interference, etc., has led to the use of complex cable systems often employing protected cables laid underground. Such installations are extremely costly (typically several millions of pounds for an oil refinery) and further high costs arise when it is desired to alter the system, for example when adding or moving a sensor.

SUMMARY OF THE INVENTION

Viewed from one aspect the invention provides a communication system operating on a single channel including a device at each of a plurality of nodes between which it is desired to establish communication, one device including means for transmitting synchronisation information and each other device having means for providing a synchronisation signal in synchrony with said synchronisation information, said one device being capable of transmitting an address of another device in one of a cyclically repeating series of consecutive time slots, at least one of said time slots in each cycle being reserved so that no such address may be transmitted, whereby any of said other devices may transmit in such a reserved time slot to request communication on said channel. Preferably, each said other device has a pre-assigned address and operates to decode transmitted information on said channel only in a particular time slot dependent on said address. Said other device is preferably arranged to transmit its address in said reserved time slot when it requests communication.

Viewed from another aspect, the invention provides a radio transmitter and receiver apparatus for providing data communication with an electrical device, comprising a transmitter circuit, a receiver circuit and an interface circuit, said interface circuit including a processor controlled by a stored program and being arranged to control the transfer of data from said device to the transmitter circuit and/or from the receiver circuit to the device, and said interface circuit being operable in a condition in which data transfer can take place or in a lower power consumption condition in which data transfer cannot take place, the interface circuit being operable automatically to enter the lower power condition when a communication operation has been completed and automatically to re-enter the data transfer condition when either a signal is received from the device indicative of the need to transmit data or a predetermined code signal is received by the receiver circuit indicative of the need to receive data.

Such apparatus enables a very low power consumption to be achieved in the cases where the device requires to transmit data only rarely or the receiver receives the predetermined code signal only rarely. In process monitoring applications, for example, a device may need to transmit data for only a fraction of a second in many hours. A further advantage of the invention is that it enables the use of a receiver system similar to known radio paging systems in which the address of an individual receiver is only transmitted when communication to that receiver is required and further can only occur in a predetermined time slot in a cyclically repeating series of time slots. This means that the receiver circuit itself can have very low power consumption because it needs only to energise internal timing circuitry continuously and to energise the rest of the receiving circuit when its assigned time slot occurs.

Preferably the interface circuit includes a microprocessor which is operable in a low power condition. Further preferably, the power supply to the transmitter circuit may be controlled by the interface circuit, the interface circuit being arranged to energise the transmitter circuit only when transmission is required.

Thus it may be seen that a very low power transmitter and receiver apparatus may be provided. A practical example of the invention provided with a small primary battery may operate for in excess of five years Because of the use of radio paging circuits which are available in the form of compact integrated circuits a very small communication device may be provided. A complete self-contained data transmitting and receiving device may be made in a package only a few centimeters in each dimension, allowing it to be mounted almost anywhere that communication is required, such as directly on a sensor or actuator.

Viewed from another aspect, the invention provides a communication system comprising a plurality of stations each having a transmitter, a receiver, a control processor and a buffer store for data to be transmitted, the control processor being responsive to the state of fullness of the buffer and arranged in dependence thereon to cause an alteration in the rate of data flow through the system. Preferably every word of data which passes through the system is accompanied by at least one bit of link control information, and each control processor includes a register for holding information indicative of the current mode of operation of the station and is arranged to combine the link control information with the contents of the register to control the subsequent operation, and in particular to provide a mode of increased rate of data throughput when the state of fullness of the buffer so dictates.

Preferably the system is a synchronous communication system with one station designated the master station providing system synchronisation signals, and defining a cyclic sequence of time slots comprising at least one synchronisation time slot, at least one interrupt time slot, and a plurality of address or data time slots, wherein any other station can transmit a message to the master station during an interrupt time slot to indicate a request to communicate. Such a system provides great flexibility in the communication paths which can be established, allows stations to remain in an inactive condition when they are not communicating, and can readily and efficiently adapt to the transmission of large or small quantities of data. In a preferred arrangement, after the master station has acknowledged the request to communicate a station may transmit to the master station the address of the destination station if this is not known to the master station. The master station may then broadcast a signal to the source and destination stations allocating them a time slot for communication. Preferably a fixed time later the data transfer takes place and if the accompanying link control information indicates that the buffer of the source station is not empty, the master station may automatically allocate further time on the transmission channel.

BRIEF DESCRIPTION OF THE DRAWINGS

An embodiment of the invention will now be described by way of example and with reference to the accompanying drawings, in which:

FIG. 1 is an overall block diagram of a transmitter and receiver, apparatus according to the invention;

DESCRIPTION OF THE PREFERRED EMBODIMENT

Referring to the drawings, a radio transmitter and receiver apparatus for providing data communication with an electrical device 6 comprises a transmitter and receiver device (transceiver) 2 which includes an antenna 3, a transmitter circuit 4 and a receiver circuit 5. The transceiver 2 is connected to an interface circuit 7 which includes a digital control processor 8 controlled by a stored program in memory 9 and is arranged to control the transfer of data from the device 6 to the transmitter circuit 4 and/or from the receiver circuit 5 to the device 6. A connection interface 10 provides any necessary electrical and protocol conversion between the device 6 and interface circuit 7, for example the provision of input or output signals in accordance with a standard interface bus.

A large number of communication stations each comprising a transceiver 2 and interface circuit 7 and any necessary interface 10 may be provided in a communication network operating on the same radio frequency. One station, which is physically similar to the others but operates a different stored program, may be designated the master station and provides synchronisation signals for all of the other stations (referred to hereinafter as "slave" stations) and controls access of the stations to the single radio channel.

Figure 2:
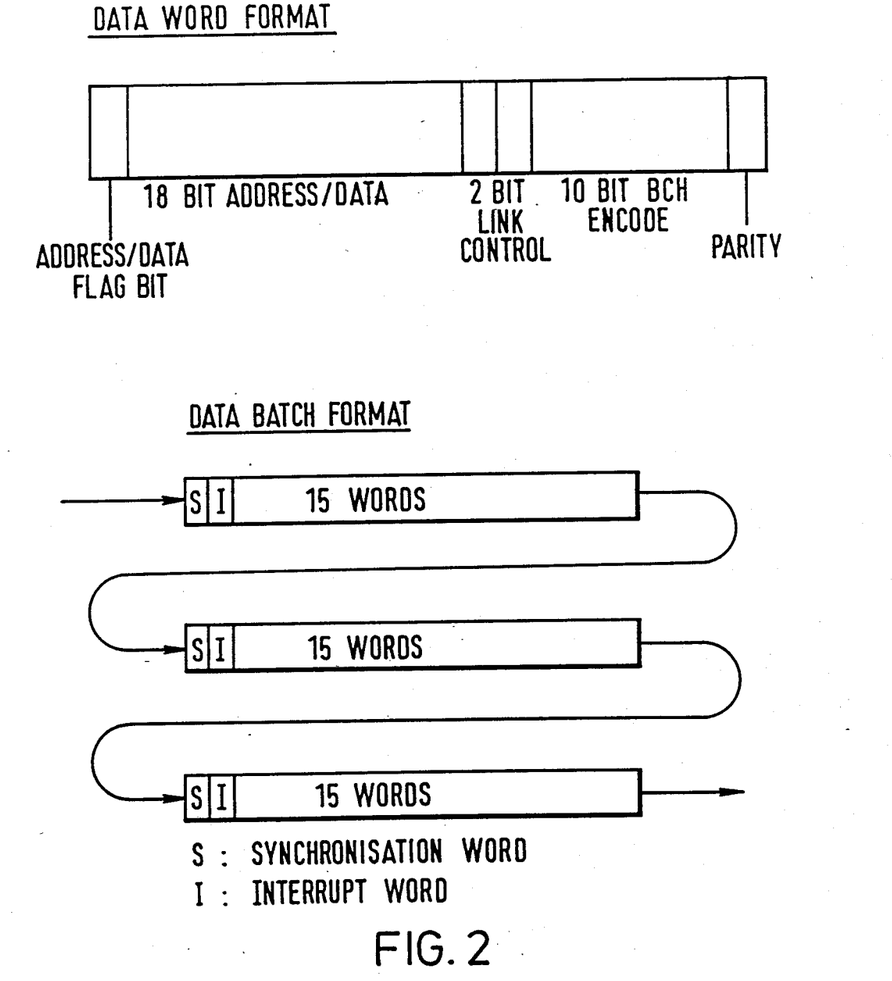
FIG. 2 is a diagram showing the data transmission format used by the apparatus of FIG. 1.

Referring to FIG. 2, which shows the data transmission format, it may be seen that digital signals are transmitted in cyclically repeating series or batches of seventeen 32-bit words. The first word in each batch is reserved for synchronisation information transmitted by the master station. The second word (referred to as an "interrupt time slot") is reserved for any slave station to transmit a request for communication service. Any device with synchronisation can attempt to transmit within this word to attract attention. The remaining fifteen tie slots are used for address or data words of the format shown at the top of FIG. 2. Each word contains an address/data flag bit which indicates whether the following information is an address or data. Eighteen bits of address or data then follow, followed by two bits of link control information. Bits 21 to 31 are BCH cyclic error checking bits and the final bit provides a parity check.

Considerable similarity will be noted with the data format employed in the POCSAG code used for digital radio paging receivers, in particular the use of synchronous communication using batches of transmission time slots beginning with synchronisation information. The receiver 5 may be generally similar to a known paging receiver and holds a pre-assigned address which as well as uniquely identifying the device indicates in which of the fifteen address/data time slots the address of the receiver will be transmitted. The receiver circuit 5 includes a low power timing circuit which operates to energise the rest of the receiver circuit only for the time slot in which its address may occur and for the synchronisation time slot thereby enabling it to maintain synchronisation with low power consumption. If no data is currently required to be transmitted, the master station transmits idle words.

Figure 3:
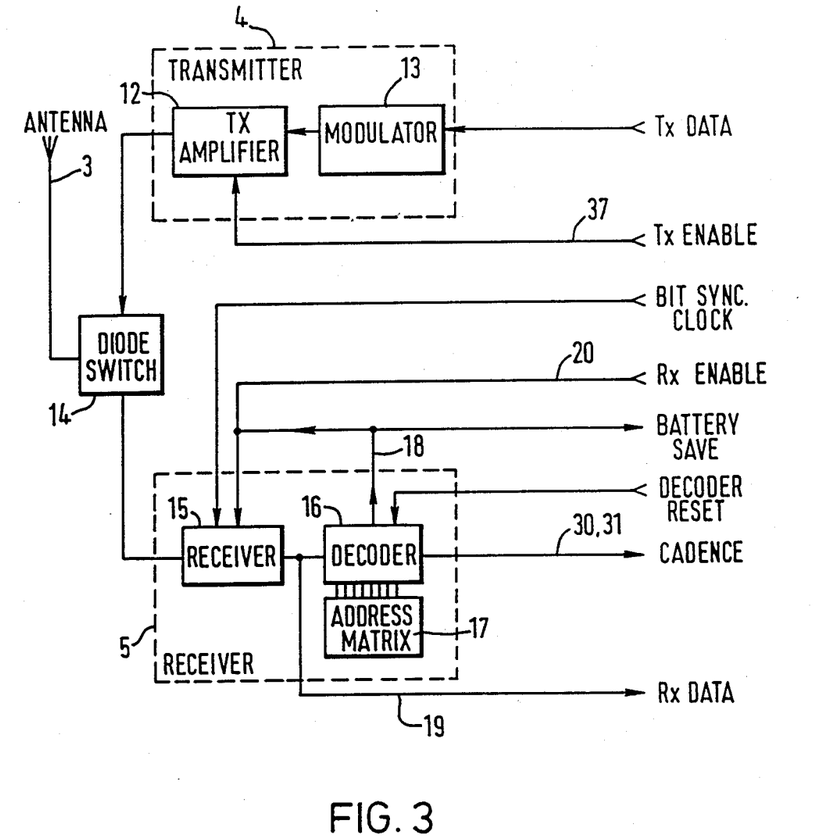
FIG. 3 is a functional block diagram of the transmitter and receiver circuits of the apparatus of FIG. 1.
Figure 4:
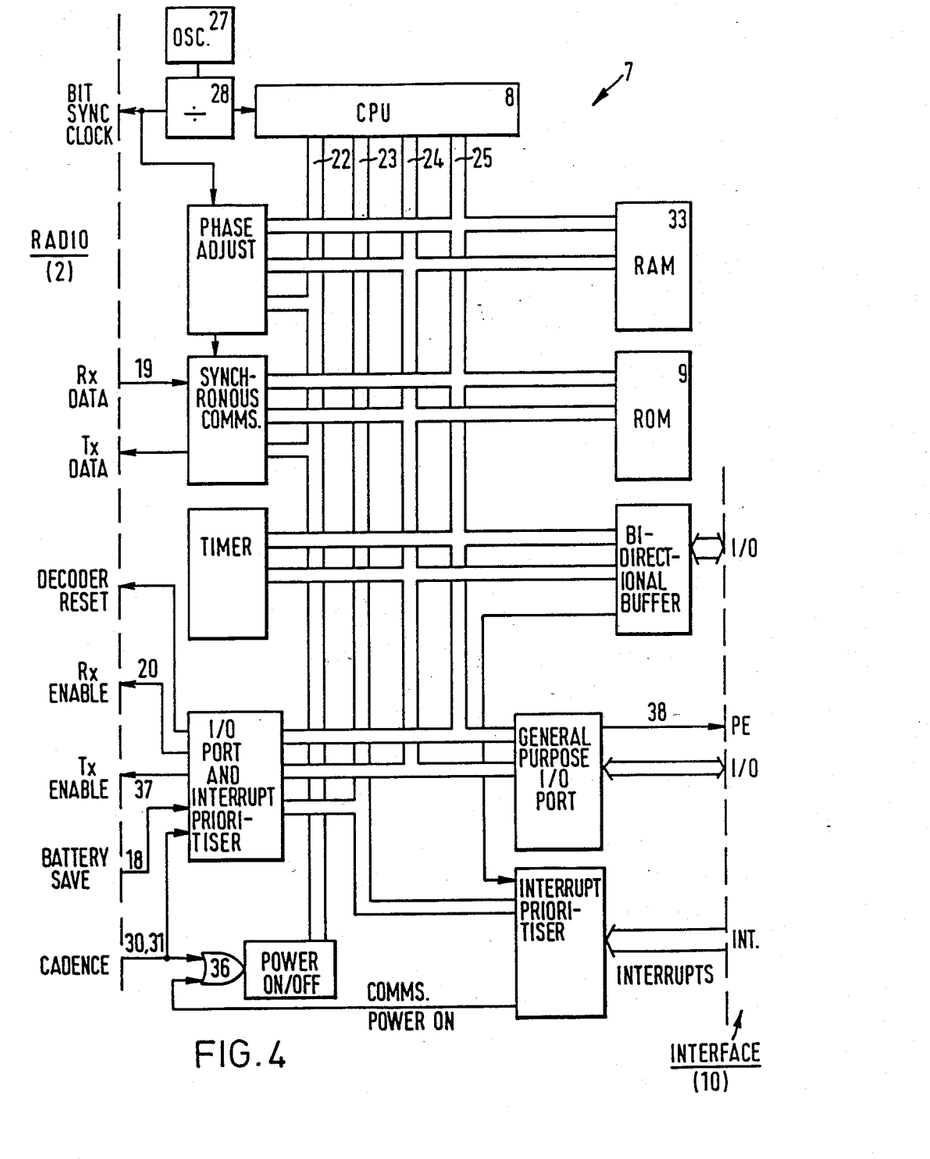
FIG. 4 is a functional block diagram of the interface circuit of the apparatus of FIG. 1.

Referring to FIG. 3, the transmitter circuit 4 includes a radio frequency amplifier 12 and a modulator 13 for providing FSK (frequency shift keying) signals to antenna 3 via diode switch 14. The diode switch operates to connect the amplifier 12 to the antenna 3 when the transmitter is operational but otherwise connects the antenna to the receiver circuit 5. The transmitter is brought to its active state only when data is being transmitted. This is achieved by including a 'transmitter enable' line from the controller. Inputs and outputs to the interface circuit 7 of FIG. 4 are shown at the right-hand side of FIG. 3. The receiver circuit 5 comprises two integrated circuits, a receiver 15 and a decoder 16. The decoder 16 includes low power timing circuits and a comparator for comparing a received address with an address stored in an address matrix 17. In operation, the decoder 16 provides a 'battery save' signal on line 18 to cause the receiver 15 to operate during each synchronisation time slot and each pre-assigned address time slot. If the correct address is received a series of square waves known as a cadence is produced and this together with the signal on line 18 causes the interface circuit 7 to process the data provided on line 19. The receiver 15 may be additionally energised by a signal on line 20 when the interface circuit 7 determines that signals should be received in a time slot other than the pre-assigned time slot. The output of the decoder can be terminated by a 'Decoder Reset' signal from the controller.

Figure 5:
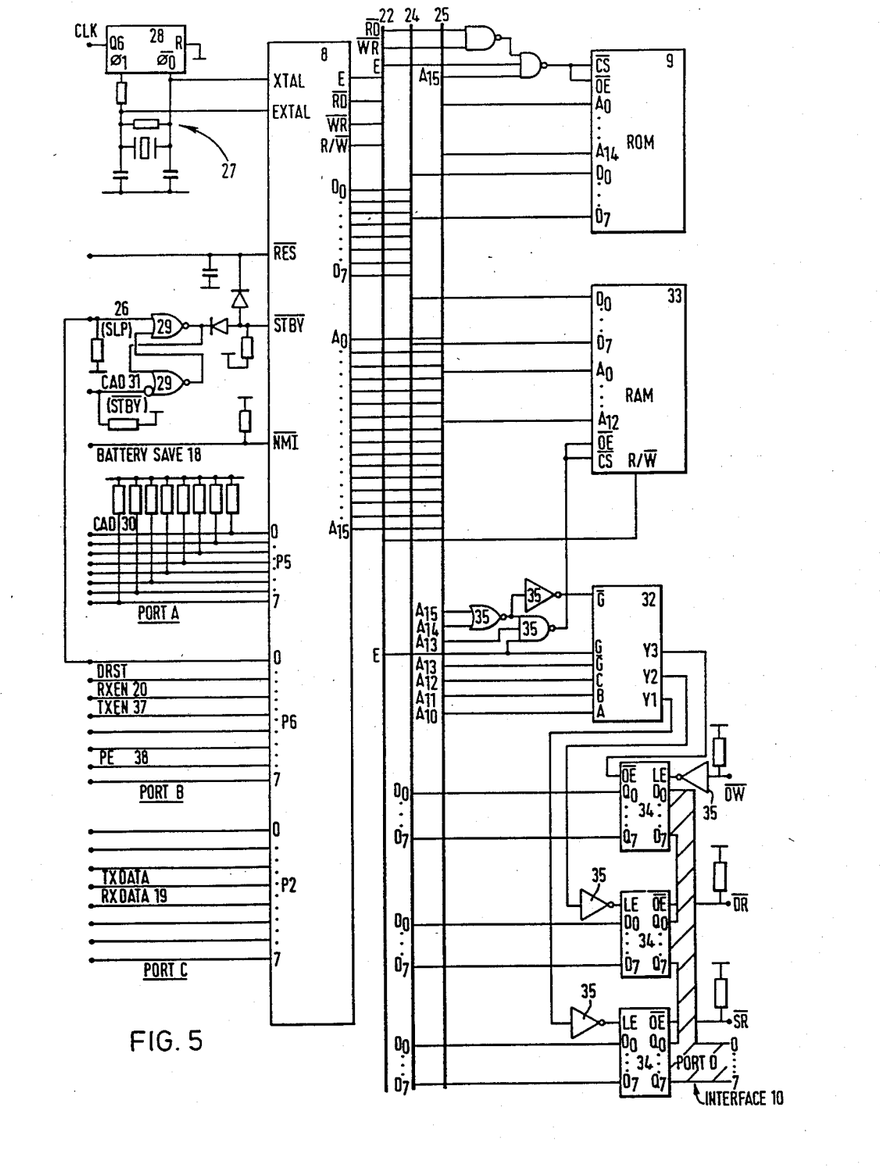
FIG. 5 is a circuit diagram of the interface circuit.

FIG. 4 shows functionally (the signal flow paths) the interface circuit 7 and FIG. 5 is a circuit diagram thereof. The interface circuit 7 controls the transfer of data between the transceiver 2 of FIG. 3 and the interface 10 provided at the right-hand side of FIGS. 4 and 5. Control processor 8 is connected to program memory 9 and the other components by control, interrupt, data and address buses 22, 23, 24 and 25 respectively. The control processor 8 is preferably a microprocessor, e.g. Hitachi 6300 series, with the facility to enter a standby mode with a signal on line 26 (FIG. 5) in which condition the program halts and the power consumption of the microprocessor is very low. In FIG. 5 the address, data and control buses are shown in solid line; the other components are a crystal oscillator 27, a divider 28, a bistable latch 29, a chip select decoder 32, memories 33, 9, data buffers 34 and associated logic gates 35.

After a communication operation has been completed, the microprocessor 8 automatically enters the low power standby condition by outputting a signal to line 26 and it remains in this condition until the station address is detected by the receiver circuit 5 or until the device 6 indicates via an interrupt request from the interface 10 that action is required. The signals which cause normal operation of the microprocessor 8 to recommence enter at the interrupt line 30 and standby line 31.

The 'Cadence' is a series of bursts of square waves at audio frequency (corresponding to th pager's bleep pattern). When received the envelope of bursts are extracted by the microprocessor. The 'Cadence Envelope' and 'Battery Save' signals are logically ANDed and if true cause the rest of the controller to become active. If not, the microprocessor is returned to the standby condition.

Cadence type is detected by comparisons with a programmable timer under the control of the CPU. Trailing or falling edges of the cadence envelope are discernable via software. From this, a 2-bit secondary address is determined. When sufficient synchronisation and cadence information has been gathered the decoder is reset by the controller. The cadence edge is not sufficiently precisely defined to allow this to be used for transferring bit and frame synchronisation to the microprocessor from the decoder. Therefore the start up sequence sets up an interrupt occurring on the leading edge of the battery save signal. This is the signal generated in the decoder that controls the low power duty cycle.

The decoder derives the timing of this battery save signal from the synchronisation signal transmitted from the aster station. On receipt of this interrupt the first action of the microprocessor 8 is to cause further interrupts from this source to be ignored. An internal timer is then initialised to divide down the system clock to create the transmission bit rate clock.

A background task in the control processor can now hold a reference point from which frame and batch edges can be accurately defined in time. Internal interrupts can be assigned to a particular frame or batch edge so that predefined events, e.g. data transmission, can occur exactly at a frame or batch edge.

Control of the transceiver involves managing reception and transmission. The reception task requires four functions of the controller: power up, capture of cadence, bit synchronisation, and provision of a bit synchronisation clock. The clock is always active and is provided via a divider chain. The fundamental frequency of the oscillator is used as the system clock for the CPU.

Using the timing gained from the 'Battery Save' signals the CPU can adjust the phase of the clock used for synchronous communication for correct reception of the incoming synchronous data.

It may be seen further that a signal line 37 is extended from the microprocessor 8 to the transmitter amplifier 12; this enables the interface circuit 7 to energise the transmitter circuit only when a transmission is required, further reducing the power requirements of the apparatus.

A multifunction interface comprising latches 34 and logic 35, 32 is provided to suit various applications. The microprocessor can address external devices as part of its own memory map, communicate via a general purpose I/O port, or load and read data via a bi-directional buffer. This latter feature allows interfacing to other processors' memory maps without need for direct memory access. The buffer can also generate interrupts on reception of data.

If the peripheral device requires communication outside of its own normal call-up time, then the controller can be powered up by means of a specific interrupt into pin 1 of port A.

A peripheral device could be a transducer, a processor or other piece of equipment, which would have a detrimental effect on the remote station battery life. To mitigate this effect, a power enable line, 38, under control of the microprocessor is also provided.. This allows further intelligent use to be made of battery power to external devices by gating it as required.

Turning now to the manner in which the master station controls access to the communication channel to provide data flow paths between the various stations, the master station maintains a list of "virtual circuits" i.e. a list of which stations require to intercommunicate. Each slave station also keeps a list of the virtual circuits in which it takes part. Each virtual circuit may be permanently operative or may be transient, i.e. only set up when required. Further, a number of default circuits may be permanently listed for use between stations which often need to intercommunicate and this reduces the housekeeping operations the master station needs to perform in that the destination station can be assumed for these frequently-used data paths rather than having to be set up each time information is being transmitted. Generally speaking, the master station listens during the interrupt time slot for a request for communication from a slave station. The slave station transmits its own address and if this is properly received by the master station an acknowledgement of interrupt signal is transmitted in the next batch. If the interrupt is unsuccessful, e.g. because a number of stations are attempting to interrupt simultaneously, each slave station attempts to interrupt a random number of batches later. On receiving an acknowledgement of the interrupt, the slave station responds in the next time slot but one (giving time to decode the data) with a message indicating the address of the other station with which it wishes to communicate. The master station then adds this link to its table of virtual circuits and transmits the address of the destination station in its appropriate address time slot. This causes the destination station to switch into the full receiving condition and the master station then indicates that the virtual circuit is open. Subsequently, e.g. a fixed time later, the data is transmitted by the first slave station and received by the other. Equally, the operation could be one of calling for information from another station. Clearly the master station has to allocate the various virtual circuits to the time slots in a manner avoiding interference between the data paths whilst utilising the available time slots efficiently. An idle word is transmitted if no other transmission is needed.

Figure 6:
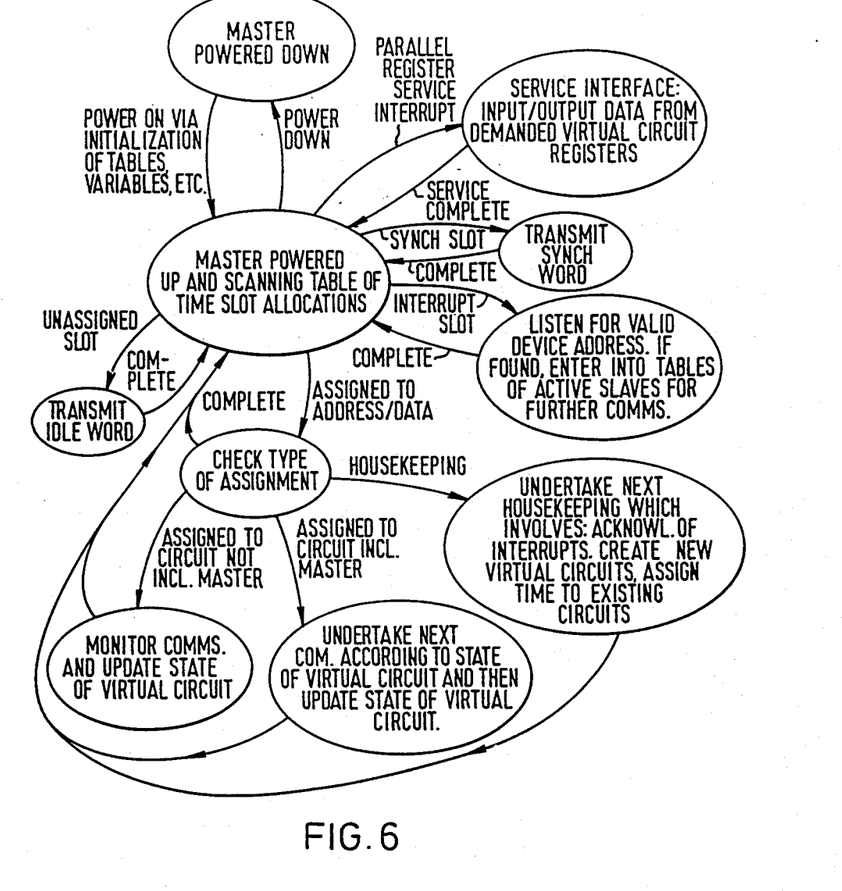
FIG. 6 is a state diagram of the function of a master station.
Figure 7:
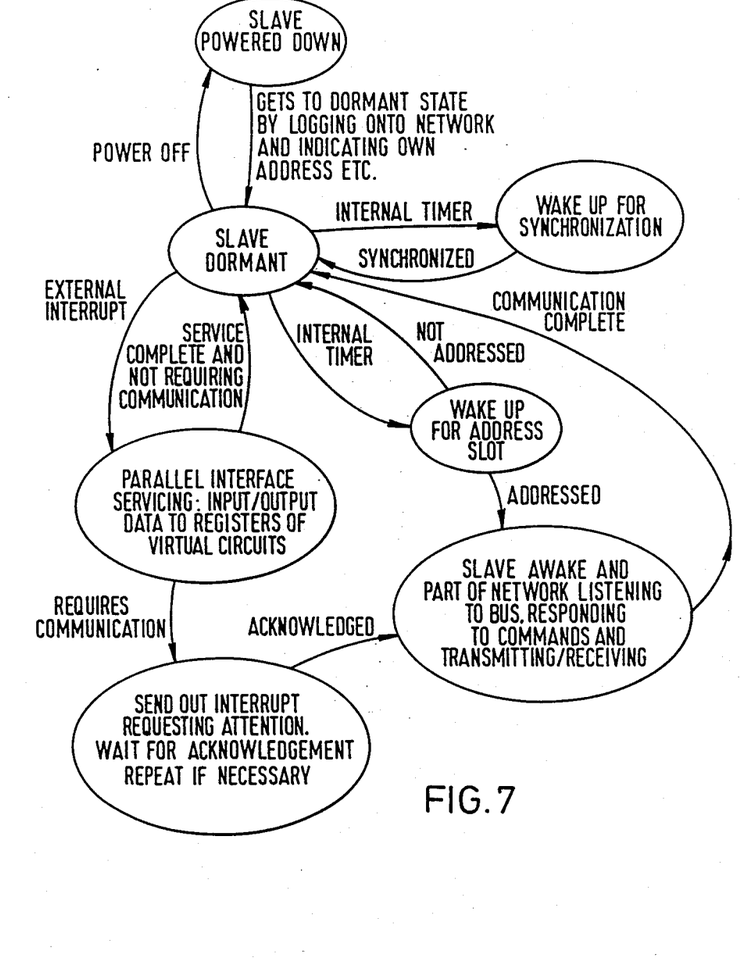
FIG. 7 is a state diagram of the function of a slave station.

When a station interface circuit 7 is first energised it is initialised if a master station by setting up the virtual circuit tables and other variables. If it is a new slave station it first logs on to the network by transmitting to the master station details as to the address and type of slave station. FIGS. 6 and 7 are state diagrams showing in high level form the steps followed by the programs in the master and slave stations respectively. After the master station is powered up it scans its table of time slot allocations. If the interface 10 demands attention, this is dealt with by inputting or outputting data from the appropriate virtual circuit register. If the time slot is a synchronisation time slot the synchronisation word is transmitted. If it is an interrupt time slot the master station receives. If a valid address is received this is entered into the table of active slave stations requiring communication. During the other time slots either a housekeeping operation is performed as previously described or the master station takes part in a communication operation or the master station monitors the channel if the time slot has been allocated to communication between two slave stations. If the time slot is unassigned the idle word is transmitted.

The slave station normally remains dormant except for the synchronisation and pre-assigned address slots in which the receiver is energised under the action of the receiver internal timer. If the receiver receives a valid address the slave station becomes operational, responds to commands on the channel and takes part in transmission and reception. If an external interrupt is received from interface 10 data is input to or output from the appropriate virtual circuit register and if the data is required to be sent to another station the slave station sends an interrupt signal requesting communication attention.

An important feature of the present invention is the ability of the system to alter the rate of data flow through the system in accordance with the amount of data awaiting transmission. In the normal operation of a virtual circuit as described above transmission of data takes place at a time dictated by the master station and for a limited time only, e.g. one time slot. In the preferred arrangement, the link control bits which are transmitted with each data word are used to indicate to the master station which is receiving or monitoring the transmission whether the data buffer which holds the information for transmission (e.g. in RAM 33) is empty. If it is, the virtual circuit is terminated. If, however, more data is required to be transmitted, the master station automatically operates to allocate further time slots to the virtual circuit. The further allocation need not be only a single time slot but may be a series of successive time slots. In a further development, the link control bits could indicate the level of fullness of the buffer, e.g. more or less than half full, which can be used by the master station for prioritising the allocation of further channel time to the virtual circuits requiring it.

Figure 8:
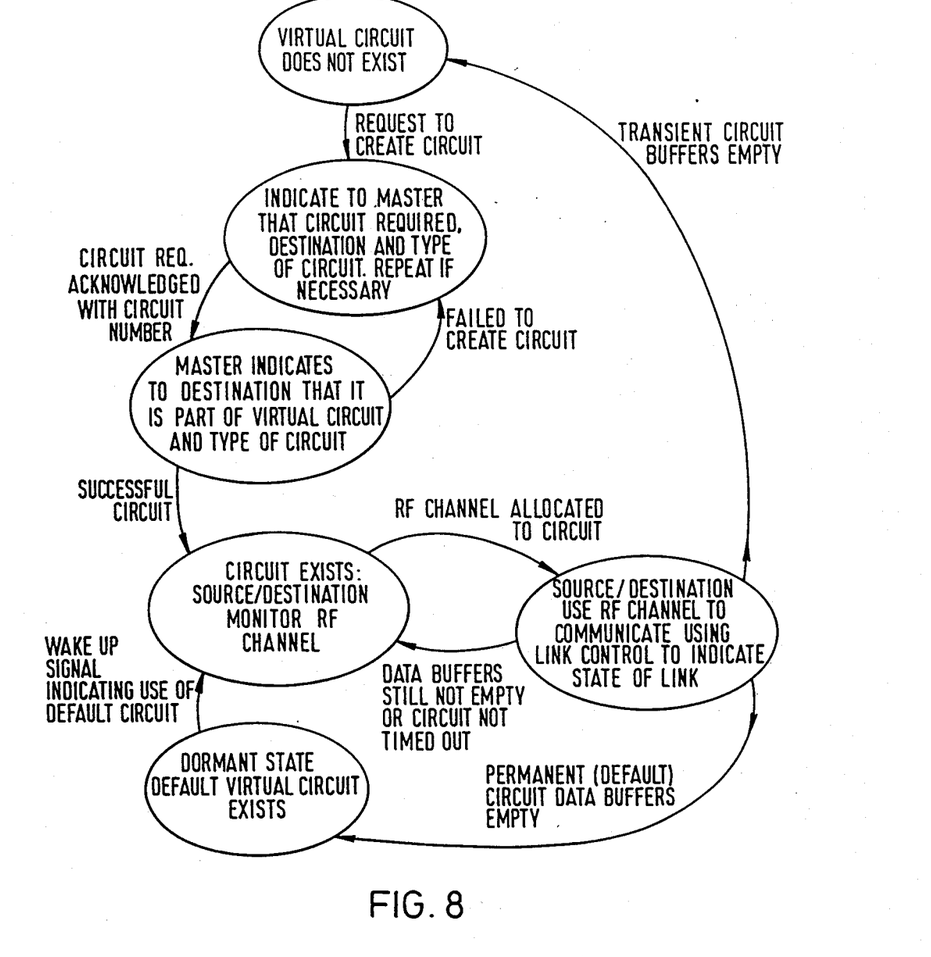
FIG. 8 is a state diagram illustrating the establishment of a communication path.

FIG. 8 illustrates this operation. If, for example, a source slave station wishes to communicate with a destination slave station it first sends an interrupt signal as described above and then indicates to the master station the address of the destination station. The master station transmits to the destination station the virtual circuit number and both the source and destination stations monitor the channel. When the master station allocates the channel to the virtual circuit the source and destination stations communicate. The link control bits indicate the state of fullness of the buffer and if it is not empty after a transmission the master station allocates further channel time. When the data buffers are empty the virtual circuit is terminated (if it were a transient circuit) or the stations revert to the dormant state with the virtual circuit still in the tables (if it were a default virtual circuit).

The resulting system is now seen from the user's viewpoint to be an array of virtual circuits via which communication can be made to a remote point through a system of hardware ports which are described to the master station by a logical port address map. Each port may have an associated buffer so that the system can be conceptualised as each virtual circuit consisting of a simple USART. Clearly the operation of the system should be totally transparent to the user and this is achieved by using the method as described.

Figure 9:
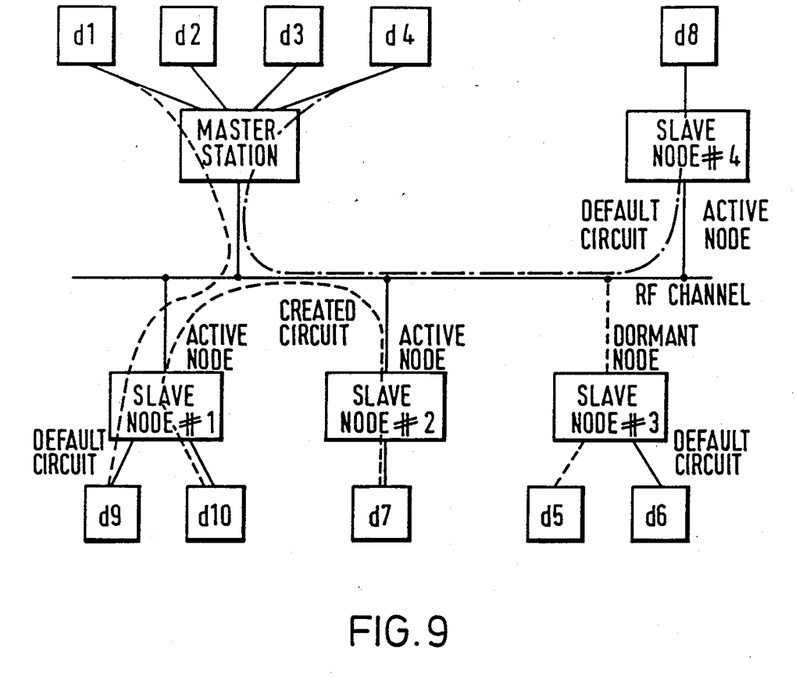
FIG. 9 is a schematic illustration of a number of data communication paths in a network.

Referring to FIG. 9, we can now build up a complete system to monitor and control. The example given is for a data logger with pens d1d4 having master to slave, slave to master and slave to slave virtual circuits. Data is simply obtained from the various field stations d8, d9 and logged on the data logger. Communication is also set up between slaves 1 and 2, i.e. devices d10 and d7. Each data logger has its own virtual circuit and is effectively connected directly to its own data source in the field. Similarly, device d10 is effectively connected directly to d7.

We claim:

1. A communication system operating on a single channel including a device at each of a plurality of nodes between which it is desired to establish communication, one device including means for transmitting synchronization information to each other device simultaneously and each other device having means for providing a synchronization signal in synchrony with said synchronization information, said one device being capable of transmitting to each other device simultaneously an address of another device in one of a cyclically repeating series of consecutive time slots, said one time slot being preassigned for transmission of said address and said other device being arranged to communicate upon receipt and recognition of its address, and at least one other of said time slots in each cycle being reserved so that no such said address may be transmitted therein, whereby any of said other devices may transmit in such a reserved time slot to request communication on said channel, the remaining time slots of said series being usable for the transmission of address information and data.

2. A communication system as claimed in claim 1 wherein each said other device has a pre-assigned address and operates to decode transmitted information on said channel only in a particular time slot dependent on said address.

3. A communication system as claimed in claim 2 wherein a said other device is arranged to transmit its address in said reserved time slot when it requests communication.

4. A communication system as claimed in claim 1 wherein every word of data which passes between said devices is accompanied by at least one bit of link control information, and each device includes a register for holding information indicative of the current mode of operation of the device and is arranged to combine the link control information with the contents of the register to control the subsequent operation.

5. A communication system as claimed in claim 1 including radio transmitter and receiver apparatus for providing data communication with an electrical apparatus, comprising a transmitter circuit, a receiver circuit and an interface circuit, said interface circuit including a processor controlled by a stored program and being arranged to control the transfer of data from said electrical apparatus to the transmitter circuit and/or from the receiver circuit to the electrical apparatus, and said interface circuit being operable in a condition in which data transfer can take place or in a lower power consumption condition in which data transfer cannot take place, the interface circuit being operable automatically to enter the lower power condition when a communication operation has been completed and automatically to re-enter the data transfer condition when a signal is received from the electrical apparatus indicative of the need to transmit data and when a predetermined code signal is received by the receiver circuit indicative of the need to receive data.

6. A communication system as claimed in claim 5 wherein the interface circuit includes a microprocessor which is operable in a lower power condition.

7. A communication system as claimed in claim 5 wherein the power supply to the transmitter circuit may be controlled by the interface circuit, the interface circuit being arranged to energize the transmitter circuit only when transmission is required.

8. A communication system as claimed in claim 1 comprising a plurality of stations each having a transmitter, a receiver, a control processor and a buffer store for data to be transmitted, the control processor being responsive to the state of fullness of the buffer and arranged in dependence thereon to cause an alteration in the rate of data flow through the system.

9. A communication system as claimed in claim 8 wherein every word of data which passes through the system is accompanied by at least one bit of link control information, and each control processor includes a register for holding information indicative of the current mode of operation of the station and is arranged to combine the link control information with the contents of the register to control the subsequent operation, to provide at least a mode of increased rate of data throughput when the state of fullness of the buffer so dictates.

10. A communication system as claimed in claim 8 wherein the system is a synchronous communication system with one station designated the master station providing system synchronization signals, and defining a cyclic sequence of time slots comprising at least one synchronization time slot, at least one interrupt time slot, and a plurality of address or data time slots, wherein any other station can transmit a message to the master station during an interrupt time slot to indicate a request to communicate.

11. A communication system as claimed in claim 10 wherein after the master station has acknowledged the request to communicate a station may transmit to the master station the address of the destination station if this is not known to the master station, the master station being arranged then to broadcast a signal to the source and destination stations allocating them a time slot for communication.

12. A communication system as claimed in claim 11 wherein after the allocation of the time slot data transfer takes place and if the accompanying link control information indicates that the buffer of the source station is not empty, the master station automatically allocates further time on the transmission channel.

* * * * *